F. A. NEIDER.
METHOD OF MAKING FLANGED NUTS.
APPLICATION FILED MAR. 10, 1910.
990,581.
Patented Apr. 25, 1911.
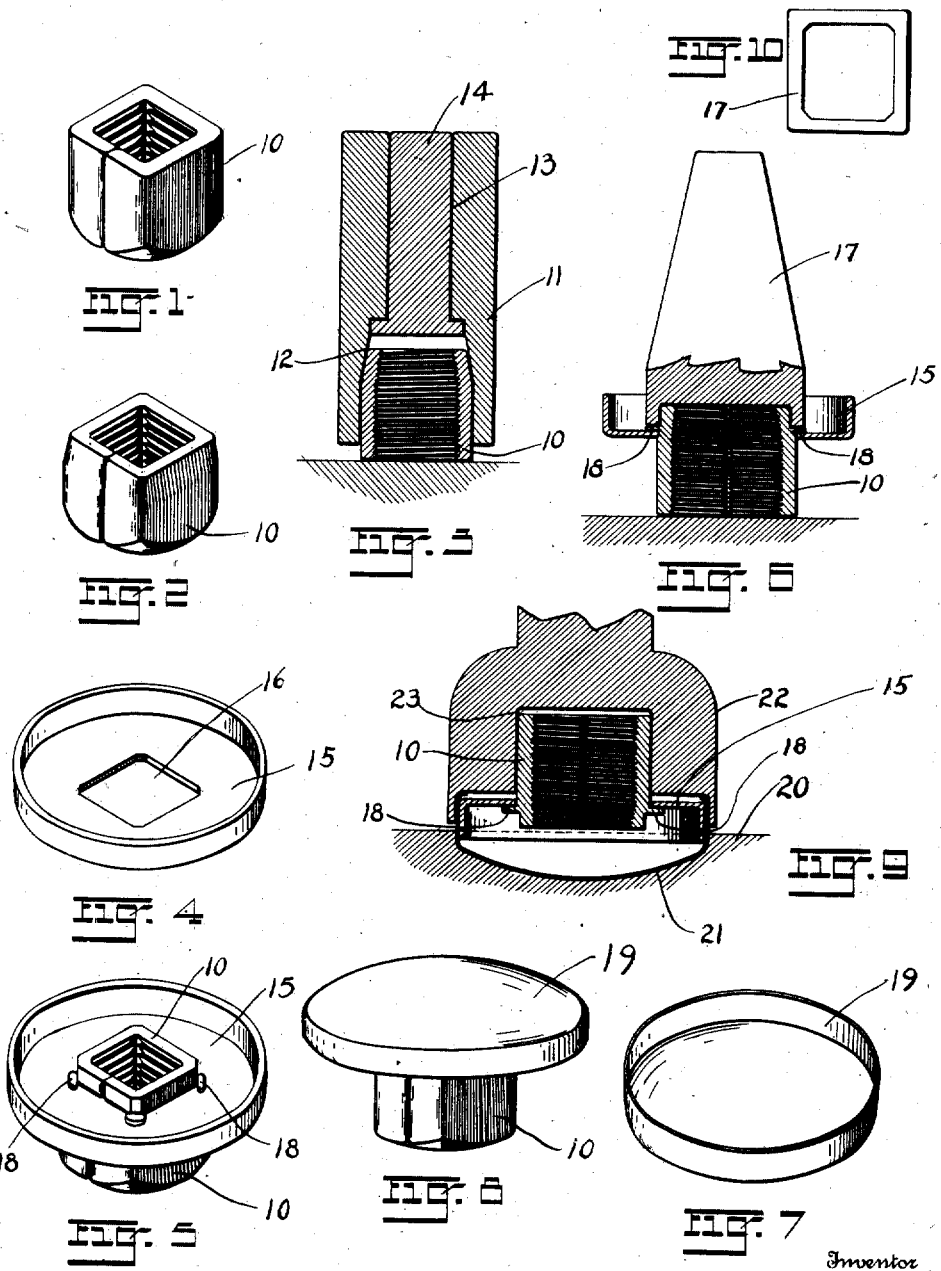

UNITED STATES PATENT OFFICE.

FRED A. NEIDER, OF CINCINNATI, OHIO.

METHOD OF MAKING FLANGED NUTS.

990,581.  Specification of Letters Patent.  Patented Apr. 25, 1911.

Application filed March 10, 1910. Serial No. 548,452.

*To all whom it may concern:*

Be it known that I, FRED A. NEIDER, a citizen of the United States of America, and resident of Cincinnati, Hamilton county, State of Ohio, have invented certain new and useful Improvements in Methods of Making Flanged Nuts, of which the following is a specification.

An object of this invention is to produce a new and simple method of manufacturing tapered or conical threaded nuts.

A further object is to produce a method of producing conical threaded flanged nuts.

These and other objects I attain by means of the process herein described as an embodiment of my invention.

In the drawings accompanying this application and forming a part thereof, I have illustrated the apparatus employed in carrying forward the separate steps of the method or process described herein, and I have also illustrated a nut as it appears throughout the various steps of the process of its manufacture.

In the drawings: Figure 1 is a perspective view of a nut formed in any suitable manner. Fig. 2 is a perspective view illustrating the nut of Fig. 1, after one end has been compressed for the purpose of tapering the threads of the nut. Fig. 3 is a sectional view of the nut, in connection with a sectional view of a die in the act of compressing one end of the nut. Fig. 4 is a perspective view of a flanged washer, which forms a part of the nut manufactured in accordance with my process. Fig. 5 is a perspective view of the nut, with the washer of Fig. 4 secured in place on its compressed or tapered end. Fig. 6 is a sectional view of the nut and washer shown in Fig. 5, in connection with a partial section of a die, which is employed in forcing the washer in place and swaging lugs on the tapered end of the nut, for the purpose of securing the washer to the nut. Fig. 7 is a perspective view of a cap, which is adapted to fit over the flange of the washer illustrated in Fig. 4. Fig. 8 is a perspective view of a nut with the flanged washer and cap in place. Fig. 9 is a sectional view of the nut shown in Fig. 8, in connection with dies for securing the cap in place on the flanged washer. Fig. 10 is an end view of the swaging die.

In Fig. 1, I have illustrated a nut 10, which is preferably made by rolling a strip of wrought metal to the desired form, and then cutting threads on the interior of the opening in the nut. A nut formed in this manner is illustrated in my Patent No. 904,555, of November 24th, 1908. The nut may, however, be formed in any suitable manner. The first operation, after the nut is formed, is to compress the walls of one end of the nut, so as to form a nut with a tapered hole, or one which is conically threaded. I perform this operation by means of a die 11, (illustrated in Fig. 3), one end of which is recessed to receive the nut 10. The walls of the inner end of the recess are tapered as at 12, so that the die compresses the walls at one end of the nut, as it is forced over the nut. The die is provided with a cylindrical bore 13, which extends longitudinally through it, and in which a plunger 14 is mounted. This plunger operates, after the pressing operation, to force the nut out of the recess of the die.

In Fig. 2, I have illustrated in perspective the nut 10, after one end has been tapered by means of the die 11. The next operation is to secure the flange on the nut. I preferably provide a flanged washer 15, which is provided with an opening 16, adapted to receive the tapered end of the nut 10. I present the nut 10 with the washer 15 in place on its outer end to a die 17, which operates to force the washer 15 to place and to secure it on the nut. The die 17 is provided with a recess 17', which receives the tapered nut, and which is so formed that lugs or wings 18 will be swaged on the nut 10, by the operation of forcing the die over the tapered nut. These lugs or wings are forced against the inner face of the flanged washer, and rigidly secure the washer in place on the nut, it being understood that the opening 16 is not large enough to receive the undistorted portion of the nut 10.

After the washer is in place on the nut, I secure a cap 19 over the flange of the washer to complete the nut. In Fig. 9, I have illustrated a set of dies adapted to secure the cap 19 on the washer 15. One of the dies 20 is provided with a recess 21, in which the cap 19 fits. The other die 22 is provided with a recess 23, which is adapted to receive the nut 10 and the washer 15 and to crimp the edge of the cap 19, so as to secure it to the washer. I first locate the cap 19 on the washer 15, which is secured to the nut 10, and then introduce the cap into the recess 21 of the die 20, as shown in Fig.

9. I then move the die 22 down over the nut 10 and crimp the edge of the cap 19, and in this manner secure it to the washer 15. This operation completes the nut.

It will be apparent that it is not essential to provide the flanged washer 15, as a straight washer may be employed and a suitable cap may be secured in place on it. By employing my invention, I materially simplify the process of manufacturing conically threaded flanged nuts. Flanged nuts are formed with the flanged portion integral with the nut portion, and, consequently, if it is desired to provide a tapered hole in the nut, the hole must be drilled by a tapered drill, and then tapped by a tapered tap, and but one nut can be tapped at a time. With my invention I employ a straight tap, and can feed one of the nut portions 10 after another on to the tap, in the ordinary manner of tapping straight threads on nuts. After the nuts are tapped, I then compress one end of the nut, as described, to taper the hole through the nut, or to form a nut with conical threads.

What I claim is:

1. A process of forming flanged nuts, which consists in tapping the nut portion, compressing one end of the tapped nut, for the purpose of tapering the tapped hole of the nut and locating a washer on the compressed end and securing the washer in place.

2. A process of forming flanged nuts, which consists in tapping the nut portion, compressing one end of the tapped nut, for the purpose of tapering the tapped hole, locating a washer on the compressed end of the nut, and securing the washer in place by swaging lugs on the nut portion.

3. A process of forming flanged nuts, which consists in tapping threads in the nut portions, compressing one end of the tapped nut, placing a flanged washer on the compressed end of the nut, and securing a cap over the flanged washer.

4. A process of forming flanged nuts, which consists in compressing one end of a straight-threaded nut, and securing a washer in place on the compressed end of the nut.

5. A process of forming flanged nuts, which consists in compressing one end of a straight-threaded nut, securing a washer in place on the compressed end of the nut, and securing a cap on the washer.

FRED A. NEIDER.

Witnesses:
E. W. McCallister,
Walter F. Murray.

---

Copies of this patent may be obtained for five cents each, by addressing the "Commissioner of Patents, Washington, D. C."